US006155354A

United States Patent [19]

Pusateri et al.

[11] Patent Number: 6,155,354

[45] Date of Patent: Dec. 5, 2000

[54] INTERCHANGEABLE GRIPS FOR POWER HAND TOOLS

[75] Inventors: Daniel S. Pusateri, Grayslake, Ill.; James R. Brehm, Racine, Wis.

[73] Assignee: Snap-on Tools Company, Kenosha, Wis.

[21] Appl. No.: 09/465,308

[22] Filed: Dec. 17, 1999

Related U.S. Application Data

[62] Division of application No. 09/062,682, Apr. 20, 1998, Pat. No. 6,082,468.

[51] Int. Cl.[7] .................... B23B 45/00

[52] U.S. Cl. .................... 173/170; 173/162.2; 173/168; 173/171; 173/218

[58] Field of Search .................... 173/169, 168, 173/170, 171, 218, 219, 162.2; 16/421, 422, 430, 431; 81/492, 177.1; D8/303; 74/551.9, 558.5

[56] References Cited

U.S. PATENT DOCUMENTS

| | | | |
|---|---|---|---|
| D. 393,194 | 4/1998 | Hogue et al. | D8/303 |
| 1,117,884 | 11/1914 | Montgomery | 173/168 |
| 2,531,800 | 11/1950 | Anderson | 173/162.2 |
| 2,619,672 | 12/1952 | Glaser et al. | 16/431 |
| 2,655,963 | 10/1953 | Dell | 173/169 |
| 2,984,210 | 5/1961 | Fuehrer | 173/162.2 |
| 3,189,069 | 6/1965 | Stowell . | |
| 3,924,961 | 12/1975 | Hess et al. . | |
| 3,952,239 | 4/1976 | Owings et al. | 173/171 |
| 4,036,085 | 7/1977 | Sjostrand et al. | 173/162.2 |
| 4,121,444 | 10/1978 | Duran | 72/114 |
| 4,381,579 | 5/1983 | Rumpp | 173/162.2 |
| 4,421,181 | 12/1983 | Andersson et al. | 173/162.2 |
| 4,478,293 | 10/1984 | Weilenmann et al. | 173/162.2 |
| 4,523,498 | 6/1985 | Chapman, Jr. | 81/177.1 |
| 4,648,468 | 3/1987 | Honsa | 173/162.2 |
| 4,673,043 | 6/1987 | Greppmair | 173/162.2 |
| 4,711,308 | 12/1987 | Blaas et al. | 173/162.2 |
| 4,732,221 | 3/1988 | Dudek | 173/170 |
| 4,771,833 | 9/1988 | Honsa | 173/162.2 |
| 4,819,742 | 4/1989 | Driggers | 173/162.2 |
| 4,879,847 | 11/1989 | Butzen et al. | 173/162.2 |
| 4,921,053 | 5/1990 | Dobry et al. | 173/162.2 |
| 4,936,394 | 6/1990 | Ohtsu | 173/162.2 |
| 4,942,791 | 7/1990 | Stewart et al. | 81/177.1 |
| 4,972,733 | 11/1990 | Olmr et al. | 74/551.9 |
| 5,027,910 | 7/1991 | Honsa et al. | 173/162.2 |
| 5,031,273 | 7/1991 | Yamaguchi | 173/162.2 |
| 5,042,804 | 8/1991 | Uke et al. | 81/177.1 |
| 5,050,689 | 9/1991 | Dobry et al. | 173/162.2 |
| 5,054,562 | 10/1991 | Honsa et al. | 173/162.2 |
| 5,186,714 | 2/1993 | Boudreault et al. | 604/21 |
| 5,213,167 | 5/1993 | Best et al. | 173/162.2 |
| 5,228,523 | 7/1993 | Rahm | 173/169 |
| 5,309,714 | 5/1994 | Putney et al. | 173/219 |
| 5,332,156 | 7/1994 | Wheeler | 173/170 |
| 5,347,684 | 9/1994 | Jackson | 16/421 |
| 5,353,474 | 10/1994 | Good et al. | 173/169 |
| 5,453,577 | 9/1995 | Everett et al. | 173/162.2 |
| 5,469,600 | 11/1995 | Sandel | 16/909 |
| 5,511,445 | 4/1996 | Hildebrandt | 74/558.5 |
| 5,546,832 | 8/1996 | Townsend | 81/25 |
| 5,797,462 | 8/1998 | Rahm | 173/169 |
| 5,992,540 | 11/1999 | Smolinski et al. | 173/169 |

FOREIGN PATENT DOCUMENTS

WO9611091 4/1996 WIPO .

*Primary Examiner*—Peter Vo
*Assistant Examiner*—Jim Calve
*Attorney, Agent, or Firm*—Seyfarth Shaw

[57] ABSTRACT

A replaceable, flexible and resilient grip is slidably fitted over a generally cylindrical handle portion of a power hand tool housing. In one embodiment, for use with a pistol grip housing with a separable end cap, the grip has a flange which is clamped between the end cap and the barrel of the housing and has lugs which fit in recesses in the barrel and end cap. The grip also has a strap portion which fits between the trigger and the barrel and a flange which fits in a groove adjacent to the barrel. In another embodiment, the tool has an air exhaust port adjacent to the handle portion and the grip defines an exhaust air passage alongside the handle portion, the grip being held in place by a retaining plate.

4 Claims, 4 Drawing Sheets

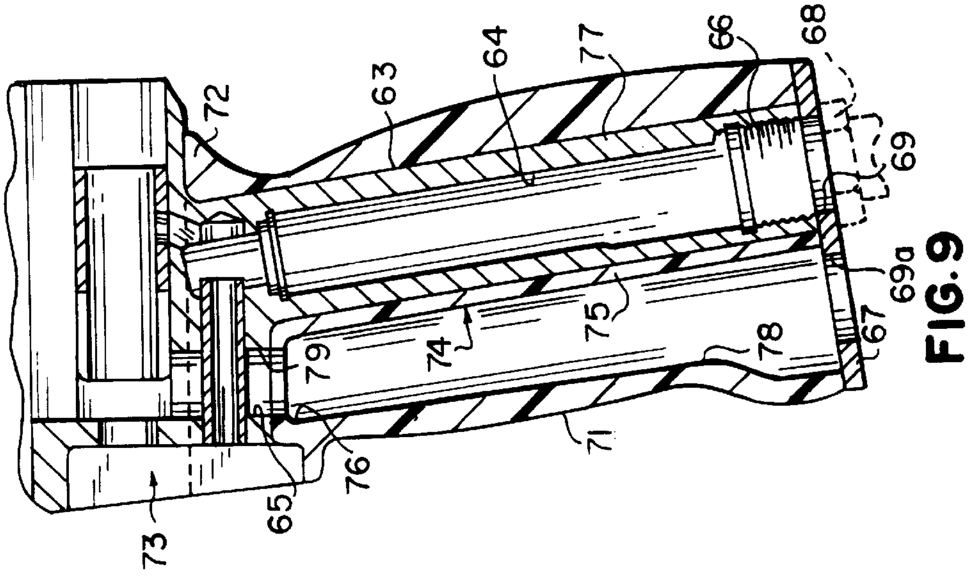
FIG. 9
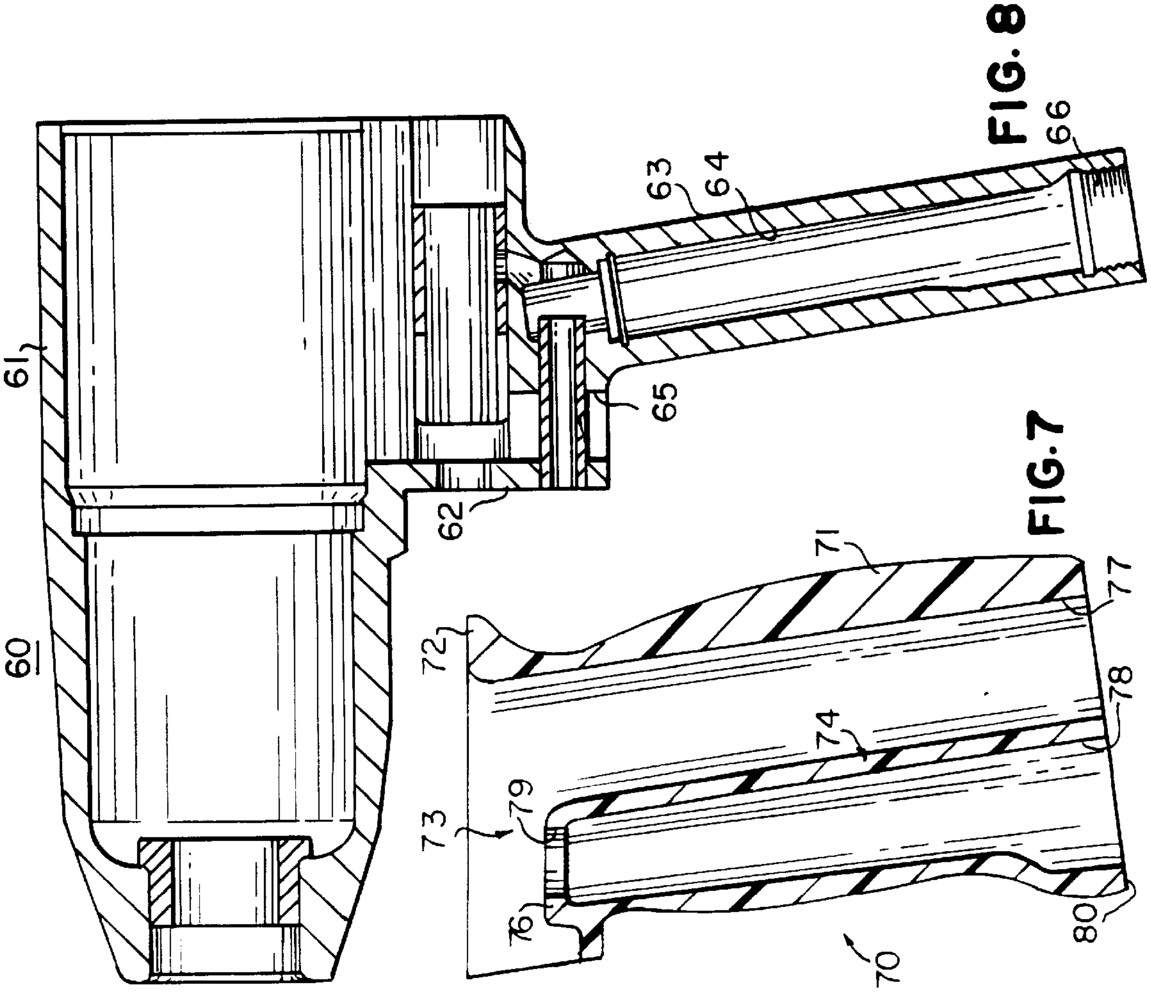
FIG. 8
FIG. 7

INTERCHANGEABLE GRIPS FOR POWER HAND TOOLS

This is a divisional of application Ser. No. 09/062,682, filed Apr. 20, 1998, now U.S. Pat. No. 6,082,468.

BACKGROUND OF THE INVENTION

The invention relates to ergonomic tool grips and, in particular, to grips for power hand tools.

Many power hand tools, such as power ratchets, impact wrenches, drills, air hammers and the like, have handles which can become uncomfortable to the user, particularly after extended use. User discomfort could be caused, for example, by heat, vibration or the like. It is known to provide handle grips for tools which are designed to improve user comfort by affording cushioning, vibration damping, thermal insulation or other properties. However, such grips are typically permanently installed on the tool during manufacture. However, different users have different-size hands and, therefore, a permanently installed grip of a specific size, shape and material, will typically not be comfortable for all users.

It is known to provide removable covers for tool housings, including tool handles, but heretofore, such covers have been of relatively complex, plural-part construction.

SUMMARY OF THE INVENTION

It is a general object of the invention to provide an improved grip for a power tool handle which avoids the disadvantages of prior grips while affording additional structural and operating advantages.

An important feature of the invention is the provision of a grip of the type set forth, which is of one-piece construction and can be removably mounted on a tool handle.

In connection with the foregoing feature, another feature of the invention is the provision of a grip of the type set forth which is generally tubular in shape and can be slid over a generally cylindrical handle.

Still another feature of the invention is the provision of a grip of the type set forth which can be securely retained in place on the tool handle.

Yet another feature of the invention is the provision of a grip of the type set forth which provides inlet and exhaust air passages for pneumatic tools.

Certain ones of these and other features of the invention may be attained by providing a replaceable grip for a generally cylindrical handle portion of a power hand tool housing which includes attachment structure, the grip comprising: a tubular body formed of a flexible and resilient material and shaped and dimensioned to be slidably received over and cover the handle portion of the tool housing, and a retention portion on the body engageable with the attachment structure of the tool housing for retaining the grip in place on the handle portion.

Other features of the invention may be provided by providing the grip with an attachment portion which is adapted to be clamped between parts of a two-part tool housing.

Still other features of the invention may be attained by providing a grip which defines an exhaust air passage running alongside the handle covered by the grip.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is an enlarged view in vertical section through the grip of FIG. 6;

FIG. 8 is a view in vertical section of a power tool housing of the type with which the grip of FIGS. 6 and 7 is to be used; and FIG. 9 is a fragmentary, sectional view of the grip of FIG. 6 installed on the handle of the tool of FIG. 8.

DESCRIPTION OF THE PREFERRED EMBODIMENT

Figure 1:
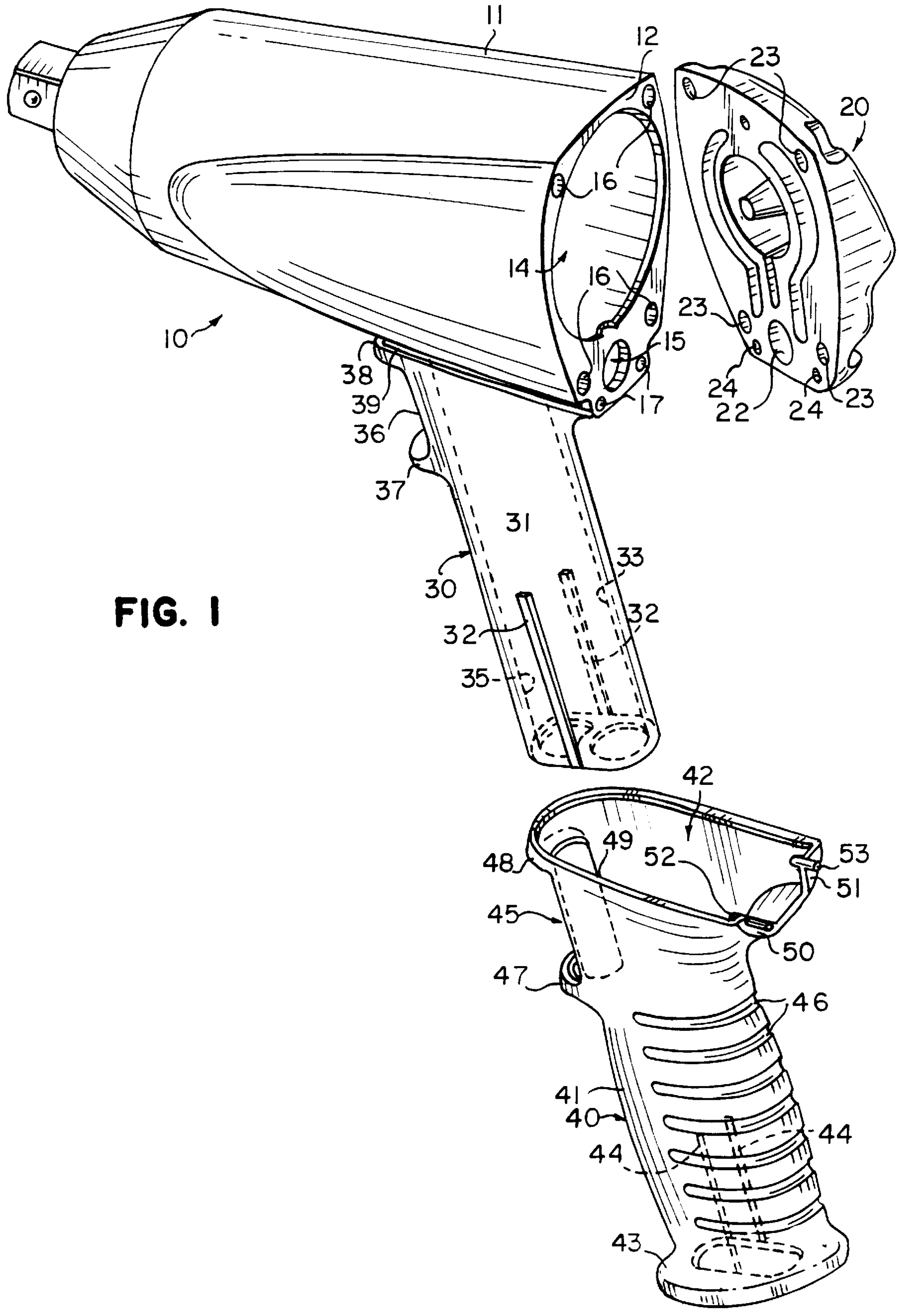
FIG. 1 is an exploded perspective view of a power tool housing and grip in accordance with a first embodiment of the invention.
Figure 2:
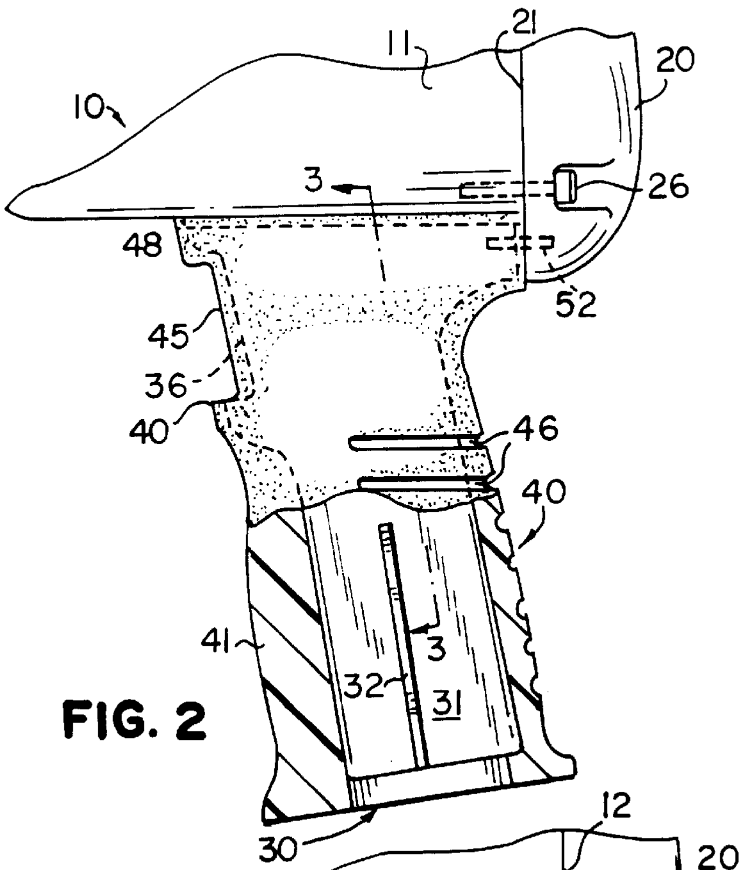
FIG. 2 is a fragmentary, side elevational view of the tool of FIG. 1 with the grip installed thereon, with portions broken away to show internal construction.
Figure 3:
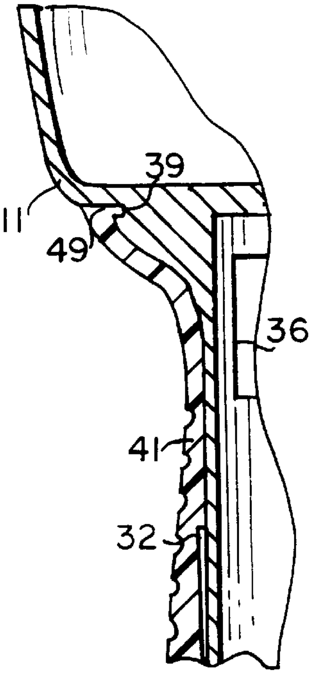
FIG. 3 is a fragmentary sectional view taken generally along the line 3—3 of FIG. 2.
Figure 4:
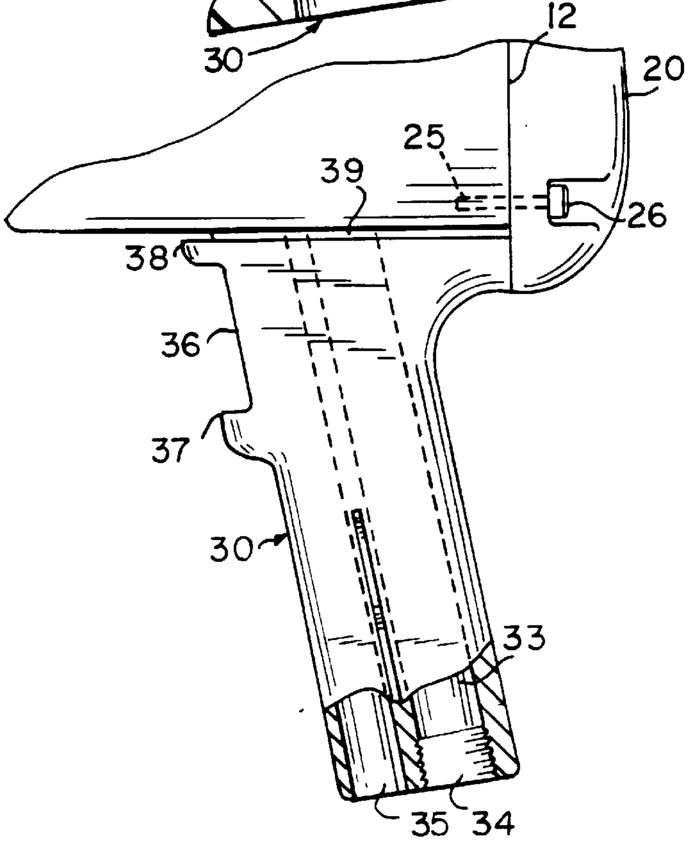
FIG. 4 is a view similar to FIG. 2 with the grip removed and with the portion of the handle broken away.
Figure 5:
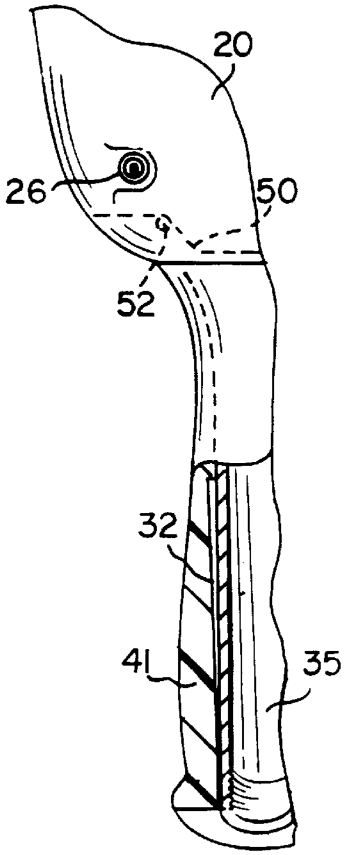
FIG. 5 is a fragmentary rear elevational view of the tool of FIG. 2 with portions of the grip broken away.

Referring to FIGS. 1–5, there is illustrated a tool housing 10 for a power hand tool. While, for purposes of illustration, the housing 10 is for an air impact wrench, it will be appreciated that the principles of the present invention are applicable to other types of hand tools, using other types of power sources. The tool housing 10 is generally of "pistol grip" shape, and includes an elongated barrel 11 terminating in a rear end face 12 having an enlarged, circular opening 13 therethrough communicating with an internal cavity 14, which houses the motor mechanism (not shown). Also formed through the end face 12 is a smaller circular hole 15, as well as a plurality of screw holes 16 spaced about the periphery of the end face 12. Formed in the end face 12 adjacent to the lower end thereof are a pair of cylindrical recesses 17.

The housing 10 also includes an end cap 20 having a front face 21 with a hole 22 and four screw holes 23 therethrough, as well as a pair of cylindrical recesses 24 formed therein. In use, the end cap 20 is fitted over the rear end of the barrel 11, preferably with a gasket (not shown) interposed therebetween, for closing the rear end of the cavity 14, being secured in place by screws 25, respectively received through the aligned screw holes 23 and 16, and screwed into internally threaded lugs (not shown) inside the barrel 11, with the screw heads 26 being received in recesses in the end cap 20. Hole 22 aligns with the hole 15 for receiving therethrough a suitable mechanism, such as a direction-control mechanism (not shown), in a known manner.

The housing 10 also includes a handle 30 which extends downwardly at an angle from the rear end of the barrel 11, having a generally cylindrical outer surface 31 of generally oval cross section. Preferably, elongated tapered ribs 32 respectively project laterally from the opposite sides of the outer surface 31 adjacent to the distal end thereof. Formed longitudinally through the handle 30 is a tubular inlet passage 33, having an internally threaded portion 34 adjacent at its distal end, and an elongated outlet passage 35, the passages 33 and 35 respectively communicating with ports in the barrel 11, for respectively passing inlet air to the motor and exhaust air from the motor, all in a well-known manner. In this regard, a suitable pneumatic fitting is fixed to the handle 30 at the threaded portion 34 for coupling the inlet passage 33 to an associated source of compressed air. Formed through the front end of the handle 30 adjacent to its upper end is a generally rectangular opening 36 for accommodating a trigger mechanism (not shown), the opening 36 preferably being flanked along its lower and upper edges by forwardly projecting flanges 37 and 38, respectively. A groove 39 is formed at the junction between the handle 30 and the barrel 11 and extends along the front and sides of the handle 30.

In accordance with the present invention a grip 40 is provided for the handle 30, the grip 40 preferably being formed of a flexible and resilient material, such as thermoplastic material, and being of unitary, one-piece construction. The grip 40 has a generally tubular main body 41 defining a central opening 42 extending longitudinally therethrough and having a generally annular flange 43 projecting laterally therefrom at one end thereof. Formed in the inner surface of the main body 41 along opposite sides thereof are two elongated, tapered grooves 44 extending longitudinally from the end having the flange 43 and terminating about midway between the ends of the main body 41. Formed in the front of the main body 41 adjacent to the upper end thereof is a generally rectangular trigger opening 45. Longitudinally spaced grooves 46 extending part way around the periphery of the main body 41 may be provided along the rear end thereof to provide an improved frictional gripping surface.

The lower and upper ends of the trigger opening 45 are, respectively, bounded by forwardly projecting straps 47 and 48, which respectively define partial loops. The upper end of the main body 41 is shaped and dimensioned to be complementary with the upper end of the handle 30 and is provided with a laterally inwardly extending peripheral bead or short flange 49, which extends around the sides and front end thereof. Integral with the rear end of the main body 41 at its upper edge are attachment flanges 50 and 51 which extend generally longitudinally of the grip 40 and are, respectively, provided with generally cylindrical lugs 52 and 53, which respectively project both forwardly and rearwardly approximately equidistantly from the corresponding flanges 50 and 51.

The central opening 42 is designed to be complementary to the outer surface 31 of the handle 30, so that the grip 40 can be longitudinally slid over the handle 30 by fitting the distal end of the handle 30 into the upper end of the grip 40, as illustrated in FIG. 1. In this regard, the handle ribs 32 will respectively engage in the grip grooves 44 to guide the mounting of the grip 40 and to prevent rotational movement thereof relative to the handle 30. The grip 40 is pushed onto the handle 30 to a mounted position, illustrated in FIGS. 2, 3 and 5, wherein the upper end of the grip 40 engages the barrel 11, with the peripheral bead 49 seated in the groove 39. In this mounted position, the straps 47 and 48 respectively cover the handle flanges 37 and 38, it being appreciated that the material of the grip 40 is sufficiently flexible and resilient to permit the different portions of the grip 40 to be moved to this fully mounted position.

Preferably, the grip 40 is installed on the handle 30 when the end cap 20 is removed. When the grip 40 is in its mounted position, the attachment flanges 50 and 51 will lie along the end face 12 of the barrel 11, with the forwardly projecting portions of the lugs 52 and 53 being respectively seated in the recesses 17, the grip material being sufficiently flexible to permit this insertion. Then, the end cap 20 is installed in place, the rearwardly projecting portions of the lugs 52 and 53 being respectively received in the end cap recesses 24 and the flanges 50 and 51 being clamped between the barrel 11 and the end cap 20. Thus, the grip 40 is securely retained in place on the handle 30.

The material of the grip 40 is preferably designed to provide both cushioning of the user's hand and shock and vibration absorption properties, as well as providing thermal insulation. Because the grip 40 is readily mountable and demountable relative to the handle 30, it is easily replaceable and interchangeable with other similar grips, which have the same internal configuration but different external configurations. Thus, a variety of grips could be provided with different sizes, different durometers of plastic material, different colors, and the like. Grips may be provided in sufficient variety to comfortably fit most user's hands, to provide color coding, or to accommodate other variations in application situations.

Referring now to FIG. 8, there is illustrated a slightly different tool housing 60 which, again, may be for an air impact wrench. The housing 60 is of the pistol-grip type, having a barrel 61 with a trigger mount 62 depending from the rear end thereof, and having extending at an angle therefrom an elongated handle 63 of generally cylindrical shape. The handle 63 defines a tubular air inlet passage 64 extending longitudinally therethrough and communicating through valve structure (not shown) and associated passageways with an air motor (not shown) to be housed within the barrel 61, all in a well known-manner. In this particular embodiment, the tool housing 60 is provided with an air exhaust or outlet port 65 just forwardly of the upper end of the handle 63. The inlet passage 64 may be internally threaded, as at 66, at the distal end thereof for accommodating attachment to the handle 63 of an exhaust plate 67 and associated air inlet bushing 68, which extends through a hole 69 in the plate 67, all in a well-known manner. Preferably, the plate 67 also has a hole 69*a* therethrough forwardly of the hole 69.

Figure 6:
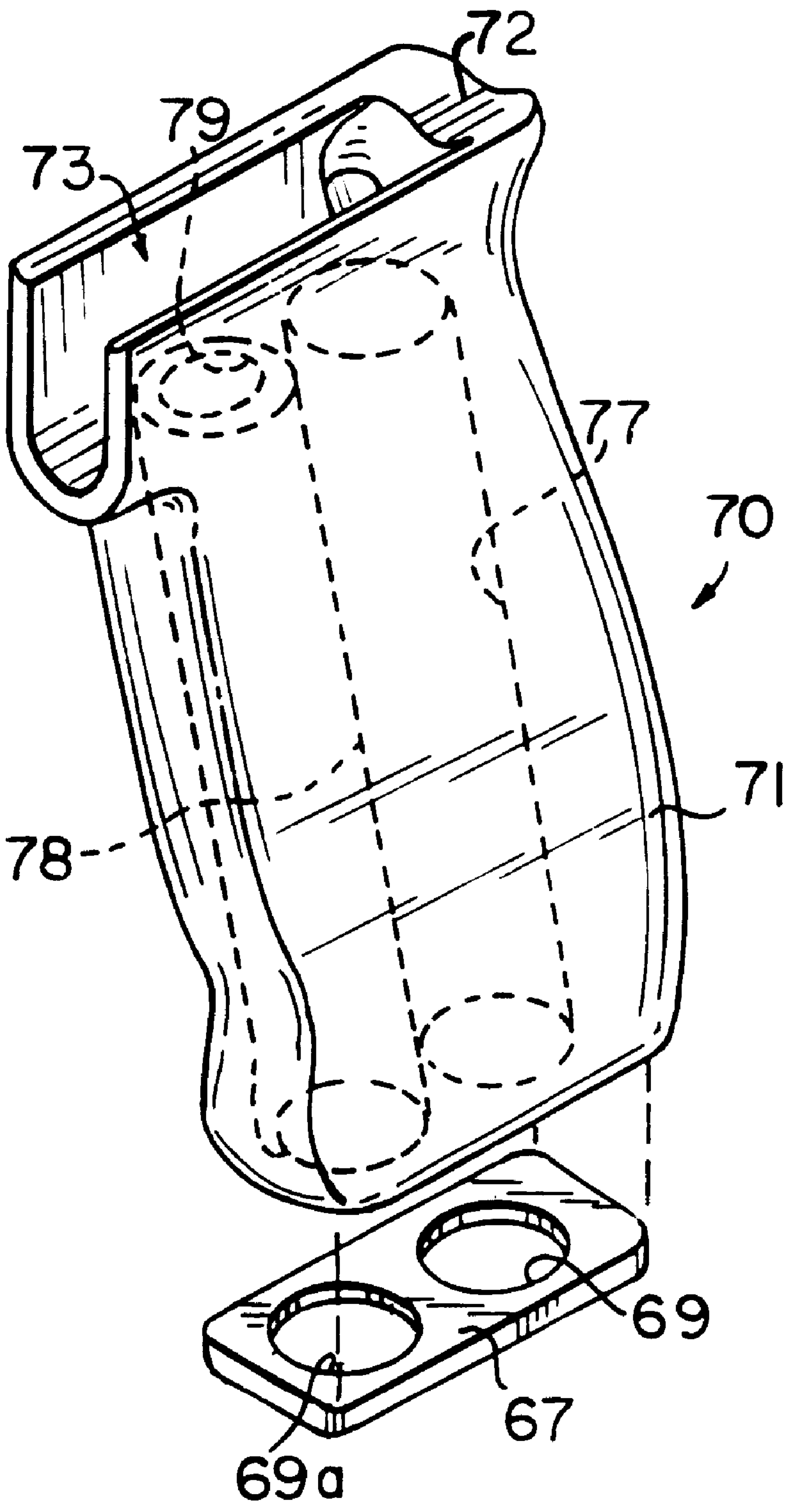
FIG. 6 is a front perspective view of a handle grip in accordance with a second embodiment of the invention, along with a retaining plate therefor.

Referring also to FIGS. 6, 7 and 9, there is illustrated a grip 70 in accordance with another embodiment of the invention, for use with the handle 63 of the tool housing 60. The grip 70 is of unitary, one-piece construction, and may be formed of the same material as the grip 40, described above, being provided at the upper end thereof with an elongated, concave seat surface 72 adapted to matingly engage a complementary surface on the trigger mount 62. Formed in the seat 72 is an elongated channel 73 to accommodate the lower end of the trigger mount 62. Extending longitudinally of the body 71 is a septum wall 74, which extends between the opposite sides of the body 71 and includes an elongated, longitudinally extending portion 75, integral at its upper end with a forwardly extending portion 76. The longitudinally extending portion 75 divides the interior of the body 71 into longitudinally extending inlet and outlet passages 77 and 78, the outlet passage 78 communicating with a port 79 through the forwardly extending portion 76 of the septum wall 74 (FIG. 7). The opposite end of the body 71 terminates in an end surface 80.

The inlet passage 77 and the channel 73 are, respectively, shaped and dimensioned to be complementary to the handle 63 and the trigger mount 62 of the tool housing 60, so that the grip 70 can be slid onto the handle 63, with the distal end of the handle 63 being fitted in the upper end of the inlet passage 77. In assembly, the grip 70 is pushed onto the handle 63 to a fully-mounted position, illustrated in FIG. 9, with the seat 72 engaged against a complementary surface on the trigger mount 62. In this mounted configuration, the outlet passage 78 communicates with the-outlet port 65 in the tool housing 60. The exhaust plate 67 and inlet bushing 68 are then installed in place, the exhaust plate 67 being shaped and dimensioned to engage the end surface 80 of the grip 70 around its entire periphery, with the hole 69*a* communicating with the outlet passage 78, thereby securely to retain the grip 70 in place on the handle 63. While the grip 70 could be formed of the same material as the grip 40, it also could be formed of a somewhat stiffer material, since it does not require the same flexibility in mounting and a somewhat stiffer material would inhibit deformation of the outlet passage 78 in use.

While, in the illustrated embodiments, the grips have been shown adapted for use with pistol grip tool housings, it will be appreciated that the principles of the invention are also applicable to power hand tools with in-line housings, such as power ratchets, for example.

From the foregoing, it can be seen that there has been provided and an improved ergonomic grip for the handle of a power hand tool, which can be easily replaceably mounted on the handle, while being securely retained in place.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A replaceable grip for a generally cylindrical handle portion of a power hand tool housing, the grip comprising:

a tubular body formed of a flexible and resilient material and shaped and dimensioned to be slidably received over and cover the handle portion of the tool housing, a transverse, concave seat at an end of said body engageable with the tool housing, a retention portion on said body said retention portion being at the other end of the tubular body disposed in use adjacent to a distal end of the handle portion, and attachment structure including a flat plate connectable to the handle portion outboard of the body, said retention portion being engageable with the attachment structure of the tool housing for retaining the grip in place on the handle portion.

2. A replaceable grip comprising:

a body formed of a flexible and resilient material and having first and second ends, the body having a concave seat at the first end defining a transverse channel therein, the body defining two substantially parallel tubular passages therethrough extending from the channel to the second end.

3. The grip of claim 2, and further comprising a flat retention plate engageable with the second end of the body for retaining it in place on an associated structure.

4. In combination:

a fluid-operated power hand tool having a housing with a generally cylindrical handle portion and a fluid exhaust port adjacent to the handle portion;

a replaceable grip including a body formed of flexible and resilient material and having first and second ends, the body having a transverse, concave seat at the first end defining a channel therein, the body defining two substantially parallel tubular passages therethrough extending from the channel to the second end, one of the passages being shaped and dimensioned to be slidably received over and cover the handle portion of the tool in a mounted position, the other tubular passage communicating with the fluid exhaust port in a mounted position for defining an exhaust passage.

* * * * *